United States Patent [19]
Sharpe, III et al.

[11] Patent Number: 5,583,496
[45] Date of Patent: Dec. 10, 1996

[54] MECHANICAL USER INTERFACE

[75] Inventors: Henry Sharpe, III; Ralph Beckman, both of Providence, R.I.; Jim McKain, Andover; Joseph Rice, Arlington, both of Mass.; Thomas Ohanian, Cranston, R.I.; Jan Adkins, Annapolis, Md.; Len Curado, East Greenwich, R.I.; Gary Perkins, San Diego, Calif.

[73] Assignee: Avid Technology, Inc., Tewksbury, Mass.

[21] Appl. No.: 932,703

[22] Filed: Aug. 19, 1992

[51] Int. Cl.⁶ .................................................. G11B 27/02
[52] U.S. Cl. ................................................ 341/22; 386/52
[58] Field of Search ........................ 341/22, 20; 340/686, 340/688, 706–711; 364/709.14, 709.15; 352/178–79; 400/472, 478, 485, 489; 200/5 A, 252, 547, 571; 360/14.1; 345/157, 168; 395/155

[56] References Cited

U.S. PATENT DOCUMENTS

| | | | |
|---|---|---|---|
| 3,721,757 | 3/1973 | Ettlinger | 360/14.3 |
| 4,040,098 | 8/1977 | Beeson et al. | 360/14.1 |
| 4,100,607 | 7/1978 | Skinner | 364/900 |
| 4,195,317 | 3/1980 | Stratton | 360/14.1 X |
| 4,272,790 | 6/1981 | Bates | 360/14.1 |
| 4,538,188 | 8/1985 | Barker et al. | 360/14.3 |
| 4,612,569 | 9/1986 | Ichinose | 348/588 |
| 4,670,743 | 6/1987 | Zemke | 340/709 |
| 4,698,664 | 10/1987 | Nichols et al. | 348/184 |
| 4,782,327 | 11/1988 | Kley et al. | 341/20 |
| 4,866,542 | 9/1989 | Shimada et al. | 360/10.3 |
| 4,922,235 | 5/1990 | Petitjean et al. | 340/686 |
| 4,956,725 | 9/1990 | Kozuki et al. | 360/14.3 |
| 4,979,050 | 12/1990 | Westland et al. | 360/14.1 |
| 4,988,982 | 1/1991 | Rayner et al. | 345/173 |
| 5,044,798 | 9/1991 | Roylance et al. | 400/472 |
| 5,050,061 | 9/1991 | Nishio | 364/900 |
| 5,073,050 | 12/1991 | Andrews | 400/489 X |
| 5,148,154 | 9/1992 | MacKay et al. | 345/119 |
| 5,202,961 | 4/1993 | Mills et al. | 395/155 X |
| 5,237,648 | 8/1993 | Mills et al. | 395/133 |
| 5,289,566 | 2/1994 | Walker et al. | 395/132 |
| 5,307,456 | 4/1994 | MacKay | 395/154 |
| 5,355,450 | 10/1994 | Garmon et al. | 395/162 |

FOREIGN PATENT DOCUMENTS

| | | |
|---|---|---|
| 0438299 | 7/1991 | European Pat. Off. . |
| 0526064 | 2/1993 | European Pat. Off. . |
| 2235815 | 3/1991 | United Kingdom . |
| 9005350 | 5/1990 | WIPO . |

OTHER PUBLICATIONS

Packaging for Logitech Trackman High Precision Stationary Mouse, 1991.
Advertisement illustrating the Lightworks Editor.
Technical Data Sheet, Hewlett–Packard linear optical incremental encoder, HEDS–9200, Dec. 1987.
Technical Data Sheet, Omron photomicrosensor EE–SX1019, date prior to Aug. 19, 1992.
Advertisement Illustrating the Lightworks Editor, date unknown.
P. Rangan, et al., "A Window–Based Editor for Digital Video and Audio," IEEE, Jan. 7–10, 1992, pp. 640–648.
Infogrip, Inc., "The Bat," product description, 1992.

Primary Examiner—Thomas Mullen
Attorney, Agent, or Firm—Wolf, Greenfield & Sacks, P.C.

[57] ABSTRACT

A mechanical user interface includes a supporting plate and a slider adapted to slide on the supporting plate. A position encoder is attached to the supporting plate to monitor movement of the slider. The position encoder provides an electrical output indicative of the position of the slider on the supporting plate. A sensor may also be provided to detect when the slider is at a zero position, thereby allowing absolute rather than relative, position data to be obtained. In a computerized film editing system, when the absolute position is less than a given threshold, the mechanical user interface may be used to advance film by a single frame. Otherwise the position may be translated to a frame per second rate.

26 Claims, 13 Drawing Sheets

MECHANICAL USER INTERFACE

CROSS-REFERENCE TO RELATED APPLICATIONS

This application is filed copending with, and claims the benefit under 35 U.S.C. §120 of, an application filed Aug. 13, 1992 and titled "Mechanical User Interface," Ser. No. 07/929,797, the disclosure of which is hereby incorporated by reference.

FIELD OF THE INVENTION

This invention relates to mechanical user interfaces for computers and other data processing systems. More particularly, this invention is related to mechanical user interfaces for computerized film and video editing systems, which provide both frame positioning and frame rate information.

BACKGROUND OF THE INVENTION

There are many types of mechanical user interfaces presently available for use with typical computer systems, such as a mouse devices, typewriter-style keyboards, adding machine-style keyboards, track balls, mouse pens, light pens, etc. These devices allow a user to provide meaningful input to a computer via mechanical structures and electrical components. In response to the depression of a button which closes a switch, or to movement, an interface provides electrical signals to a computer. The computer examines the state of the device either periodically or as changes occur. A computer may perform predetermined operations, depending on how it is programmed, in response to input from the interface.

Currently-available position-based devices, such as mouse, track-ball or mouse pen devices, only provide relative position information. That is, there is no predetermined initialization or zero-position of the device. As the device is moved only its movement relative to a prior location can be determined.

Such mechanical user interfaces are typically used to control the position of a cursor on a screen. The initial position of the cursor is predetermined by the computer, so initial position information does not need to be known for the mechanical user interface.

As film editing systems have been increasingly developed for use on typical computer systems, it has been found that available mechanical user interfaces are unnatural to professional film editors. Professional film editors, who typically use analog systems for editing final production films, are familiar with what is known in the art as the Steenbeck controller. The Steenbeck controller is an electromechanical device used for manipulating film for editing, and is typically built into the console of a film editing system in a large production facility. The Steenbeck controller has a handle which is attached to a fixed rotation point. By rotating the handle in one direction, film may be advanced; by moving the handle in the opposite direction, film may be reversed. Film may also be stopped at any fixed point. The Steenbeck controller provides a range of film speeds in both forward and reverse directions: normal speed (sound speed), a range of slow motion, still and fast forward. In response to the actual position of this device, the film is advanced at the desired speed.

The Steenbeck controller is also problematic for film editors because it requires substantial skill to edit film with it. The Steenbeck controller provides fixed zero-, sound speed and fast-forward positions using magnets. A film editor must keep the operating hand on the controller to prevent it from moving, unless it is in one of the fixed positions. Thus, it is difficult to maintain a frame rate which is close to, but not the same as, sound speed, zero-speed or fast-forward. Furthermore, the device only affects the rate of the film advancement. Therefore, it is difficult to provide single-frame advancement; an editor must learn the right "feel" of the device and how to tap it to obtain frame positioning control.

Presently available mechanical user interfaces for computer systems are unnatural because they do not provide actual position information, such as a defined zero-position, and require further means to be useful for computerized film or video editing systems. Moreover, currently available devices for both computer systems and film editing systems do not provide both frame rate control and frame position control (i.e., single frame advancement) of film.

Accordingly, it is an object of the present invention to provide a mechanical user interface for a computer, which feels natural to film editors.

It is another object of the invention to provide a mechanical user interface for a computerized film or video editing system which provides both film rate and film positioning control.

SUMMARY OF THE INVENTION

To achieve the foregoing and other objects, there is provided a mechanical user interface which includes a supporting plate and a slider adapted to slide on the supporting plate. Sliding movement of the slider is detected, for example, by a position encoder attached to the supporting plate. An electrical output, indicative of the position of the slider on the supporting plate, is then provided by the encoder. A sensor may also be provided to detect when the slider is at a zero position, thereby allowing absolute rather than relative, position data to be obtained. The movement of the slider may be such that it follows the natural curvature of movement of a hand.

A device with a known zero-position and which provides absolute position information, in conjunction with a computer, may be used for editing motion pictures, including film, video and digitized video data. A range of positions may be defined, e.g. by using a programmable threshold, to indicate film positioning control. Other positions may be used to indicate different film rates, e.g. under the control of computer programs operating using the position information.

DETAILED DESCRIPTION

Figure 1:
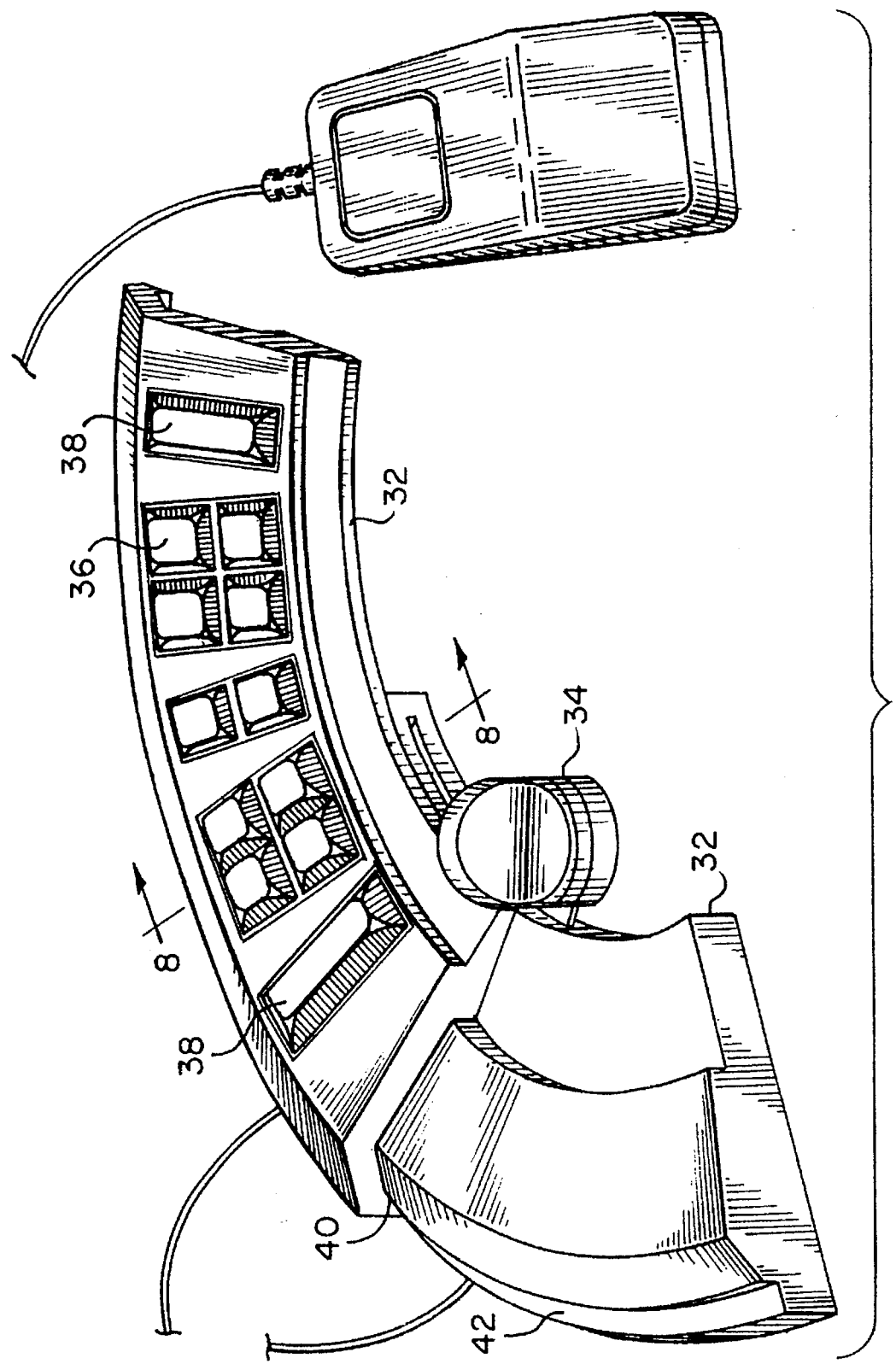
FIG. 1 is a perspective view of an embodiment of the present invention.

The following is a detailed description of an embodiment of a mechanical user interface in accordance with the present invention. FIG. 1 is a perspective view of this embodiment as it may appear to a user. This embodiment includes two separate sections 30 and 32. The first section 30 includes a sliding mechanism 34. The second section 32 is a keyboard, whose keys are similar to those of standard keyboards used with computer systems. This embodiment includes ten keys 36 and two "shift" keys 38.

The two sections 30 and 32 are adapted to engage with each other. The bottom 40 of the second section 32 rests on the top 42 of the first section 30. The curved shape or arcuate of the two sections, aside from its aesthetic appeal, is ergonometric in that a user moves the sliding mechanism 34 along a curve or arc which corresponds to the arc followed during movement of the hand.

Figure 2A:
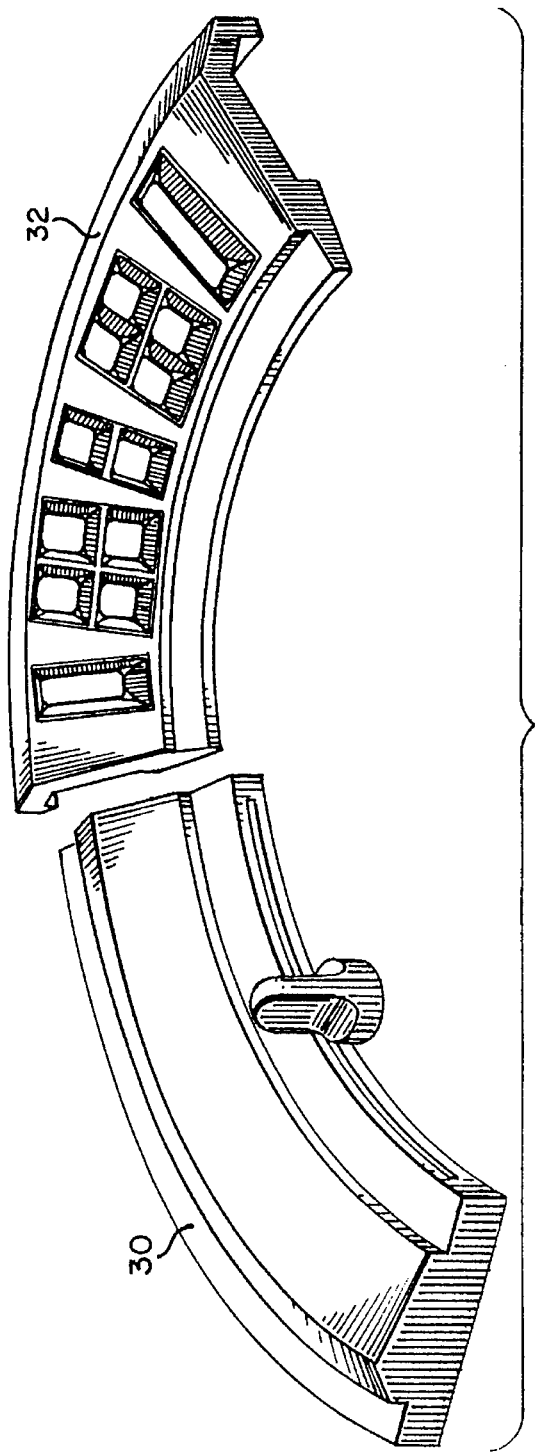
FIGS. 2A–2C are perspective views of different configurations of the embodiment of FIG. 1.
Figure 2C:
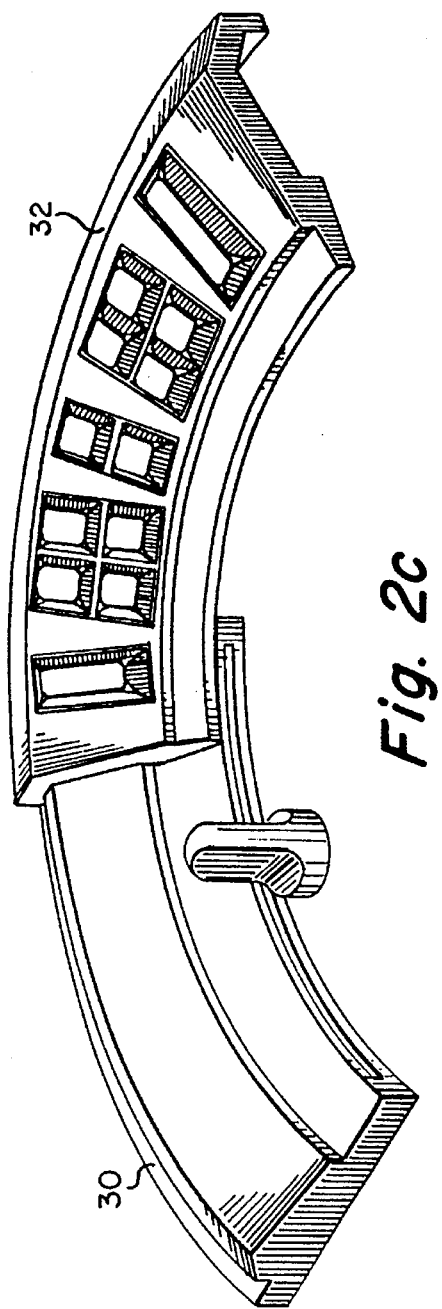
Figure 2B:
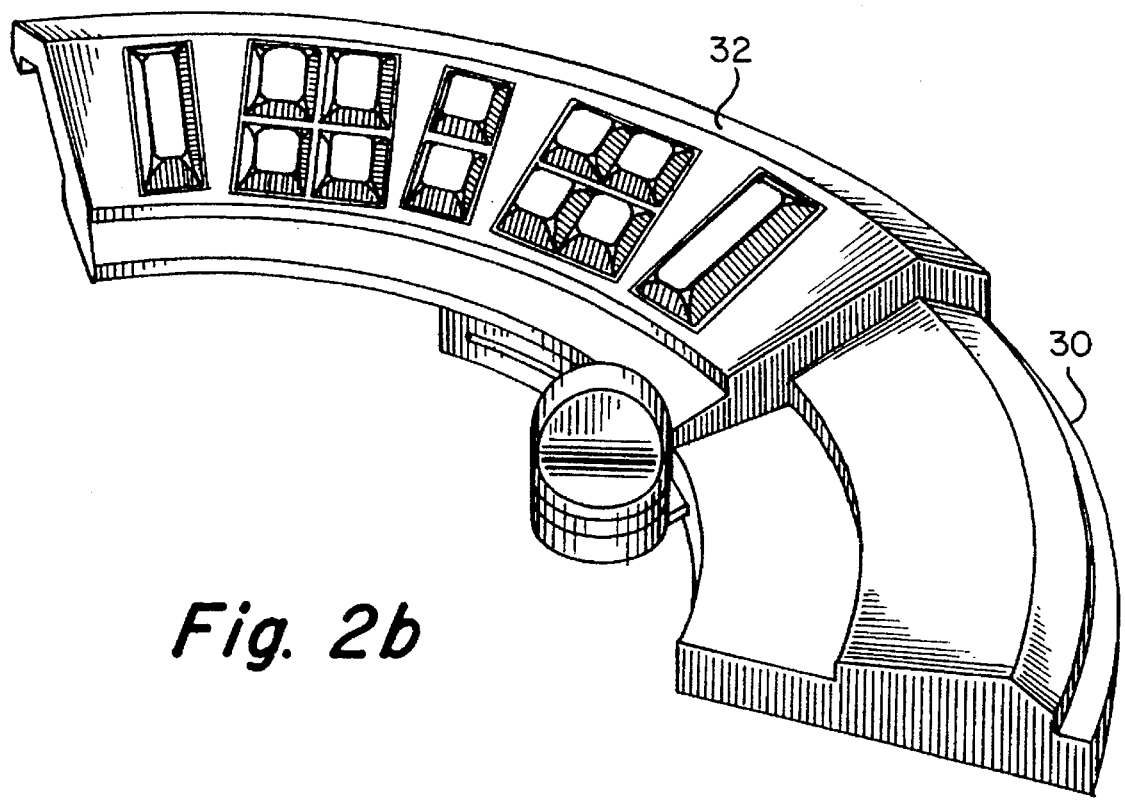

The use of two sections 30 and 32 allows a user to place section 30, housing the sliding mechanism 34, and section 32, housing the keyboard, at locations which are comfortable and convenient. Such positions are shown in FIGS. 2A–2C. In FIG. 2A, the first section 30 is shown separate from the second section 32. This enables a user to place the keyboard and the slider mechanism at any desired location. The user may also wish to operate the mechanical user interface with one hand. FIG. 2B shows a configuration suitable for use with the left hand, whereas FIG. 2C shows a configuration suitable for use with the right hand. The user could operate the slider mechanism 34 with the thumb and the keyboard with the four fingers.

The keyboard will be described in more detail below in connection with FIG. 9. The slider mechanism will now be described in connection with FIGS. 3–7.

Figure 3:
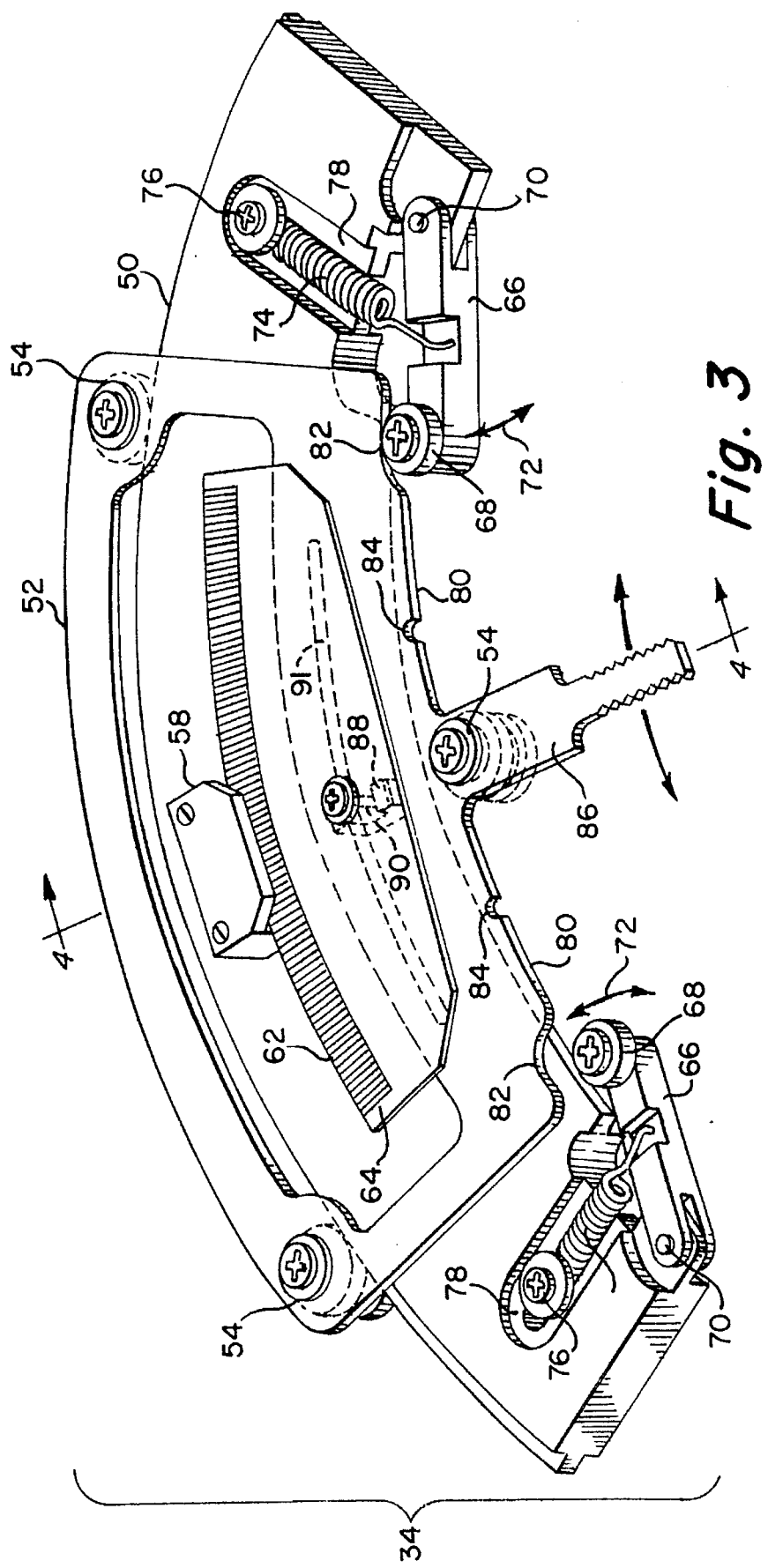
FIG. 3 is a perspective view of the slider mechanism of this embodiment.

FIG. 3 is a perspective view of the slider mechanism 34 found within the first section 30 of this embodiment of the mechanical user interface. This slider mechanism 34 includes a supporting plate or base 50 which supports a slider 52 via rollers 54 attached to the slider which engage a track 56 on the supporting plate 50. The base 50 is preferably made of heavy material, such as steel, to reduce movement of the device when the slider 52 is moved.

A position encoder 58 detects motion of the slider 52 in the left and right directions, as indicated by arrow 60. A suitable position encoder is the linear optical incremental encoder module HEDS-9200, available from Hewlett-Packard Company, Palo Alto, Calif. Position encoding may also be performed using other devices, such as potentiometers. An optical position encoder such as the HEDS-9200 is used in conjunction with a code strip 62 to detect linear position. The code strip 62 has marking lines 64 which are counted by the position encoder 58 as the code strip is moved through the encoder. By counting marking lines, distance may be measured between two points when the slider 52 is moved. A suitable code strip for this embodiment will be described in more detail below in connection with FIG. 7. The encoder 58 shown in FIG. 3 will be described in more detail below in connection with FIG. 6. The sliding mechanism 34 also includes a spring-loaded roller mechanism including an arm 66 with a roller 68. The arm is pivotally attached to the supporting plate or base 50 at location 70 allowing rotation in the directions indicated by arrow 72. A spring 74 is attached to arm 66 and to the base 50 via screw 76. The screw 76 may be moved within channel 78 to adjust the force exerted by the spring 74 on the arm 66. The roller 68 engages the slider 52 due to the action of spring 74. The roller 68 follows the edge 80 of the slider as it is moved in the direction indicated by arrow 60. At the edges 82 of the slider 52, there is an indentation and a ramp-shaped cam, called a zero-detent, which roller 68 follows. The ramp-shaped cam has an angle of about 45° closest the zero-position. As the slider is moved from the zero-position, the roller follows a steeper angle, about 70°. This shape makes it more difficult for the slider to leave the zero-position accidentally. When the slider 52 is centered, at its zero position, each roller 68 engages its corresponding zero-detent. As the user moves the slider 52, the rollers follow edge 80 until they reach detents 84. The purpose of these detents will be described in more detail below. The slider 52 can be moved until the roller 68 hits the handle 86.

The slider may also include a photomicrosensor 88 for detecting when the slider 52 is at its zero position. A groove 91 extends throughout the range of the slider movement in the supporting plate or base 50 for engagement with a pin (not shown) which is used in conjunction with the photomicrosensor. The photomicrosensor 88 will be described in more detail below in connection with FIG. 5.

Figure 4:
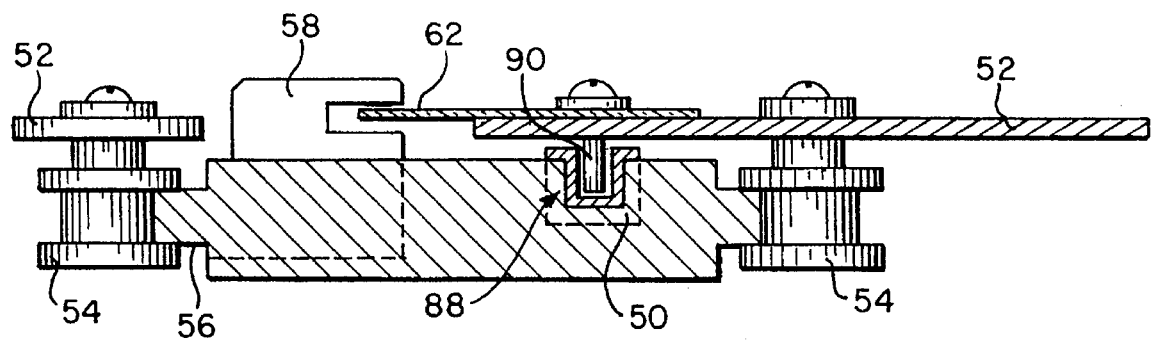
FIG. 4 is a cross section of the slider mechanism of FIG. 3.

FIG. 4 is a cross section taken at arrows 4 on FIG. 3, in which the engagement of rollers 54 with track 56 can be seen more clearly. The engagement of the code strip 62 with the position encoder 58 can also be seen. The photomicrosensor 88 also has a gap contiguous with the groove 91 through which a pin 90 passes.

Figure 5:
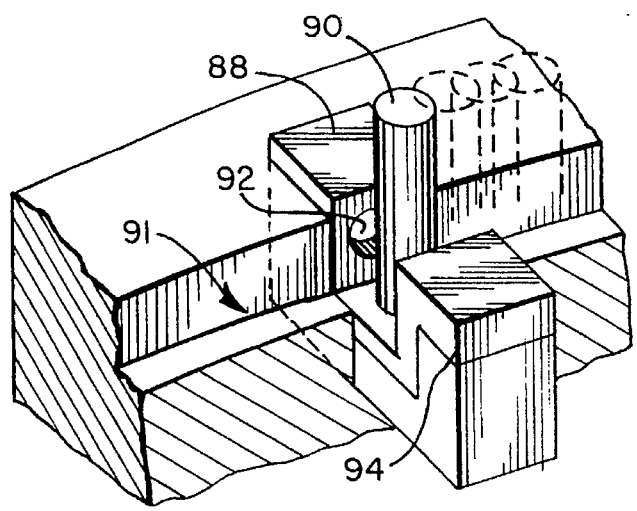
FIG. 5 is a perspective view illustrating the operation of a zero-position photomicrosensor.

The operation of the photomicrosensor 88 will now be described in more detail in connection with FIG. 5, which is an enlarged perspective view of the photomicrosensor. This device is a phototransistor which has a light transmitter 92, such as an LED and a light receiver 94 facing each other opposite a gap. The light receiver 94 receives light from the light transmitter 92 and provides a binary output signal indicative that light is being received. The output of the device is a voltage of one logical value when the light is received by the receiver, and another logical value when the light path is interrupted. When pin 90 is passed through the gap between the light transmitter 92 and light receiver 94, the output signal of this device changes. By placing a photomicrosensor 88 at a location such that, when the slider is at its zero-position (i.e., when the rollers 68 engage zero-detents 82), detection of the zero-position is possible. Thus, this embodiment of the slider mechanism can provide an output indicative of absolute, rather than relative, position.

Figure 6:
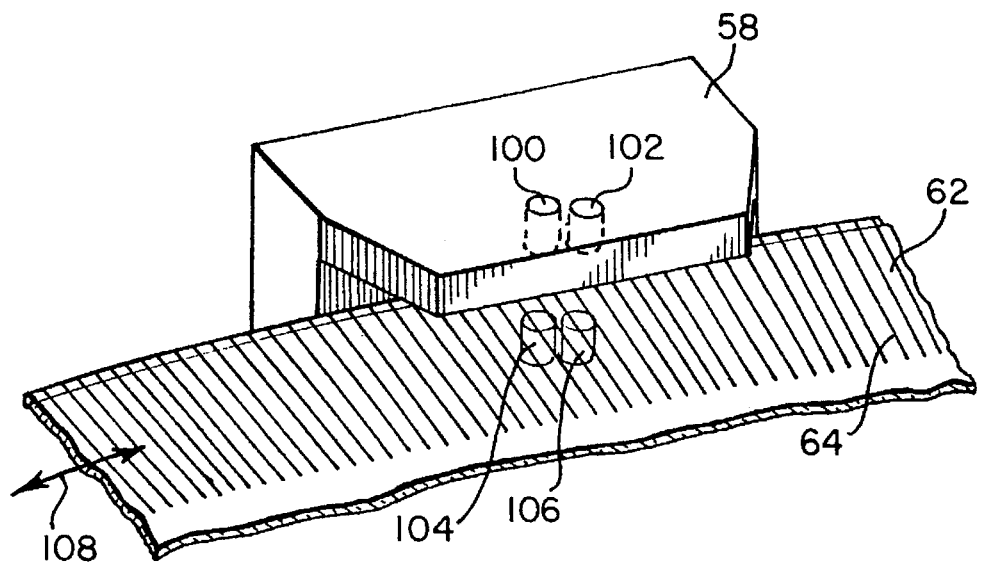
FIG. 6 is a perspective view of the operation of a position encoder.

FIG. 6 is an enlarged perspective view of the HEDS-9200 encoder which includes a lensed LED source and a detector IC enclosed in a small C-shaped plastic package. A highly collimated light source and a unique photodetector array makes such a module tolerant to mounting misalignment. Such a device is also TTL compatible and uses a single five volt supply. Encoder 58 includes two light transmission devices 100 and 102 each with corresponding light receiving devices, 104 and 106. Two transmitting devices are used in order to provide a two channel quadrature output. The code strip 62 includes a number of lines 64 which are detected by the encoder 58 as the code strip is moved between the light detectors 100 and 102 in the direction indicated by arrows 108. The output of the encoder 58 changes as the light is interrupted by one of the lines on the code strip 62. As the code strip 62 is passed through the encoder, therefore, the output wave form of the two channels is a number of pulses. These pulses can be counted, and the direction of movement can be determined by virtue of the quadrature output, in a manner to be described below.

Figure 7:
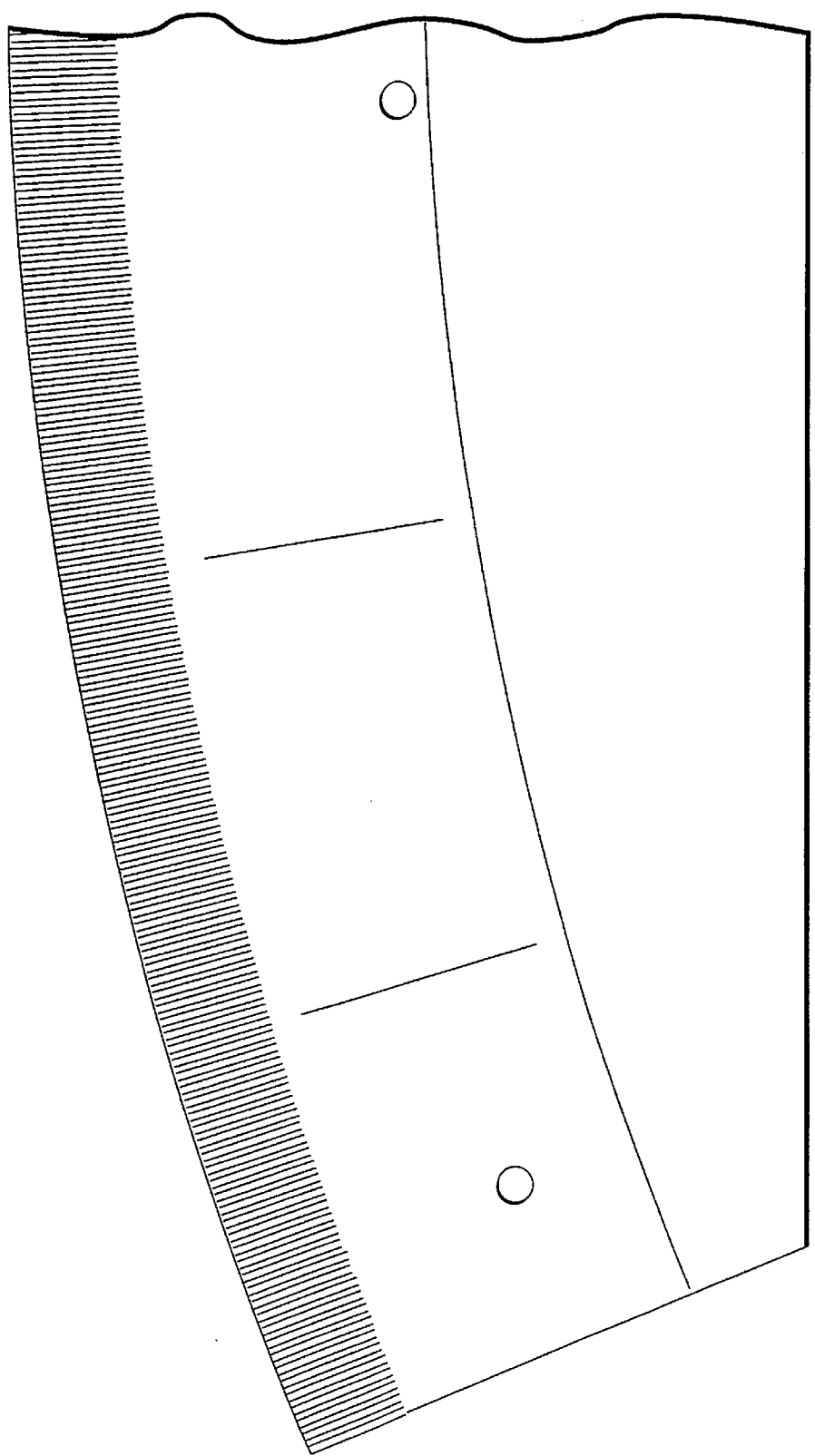
FIG. 7 is an enlarged plan view of a code strip for use with the position encoder.

A suitable code strip 62 is shown, enlarged four times, in FIG. 7. The resolution provided by this code strip is much greater than is needed for film and video editing applications, and is therefore suitable for other more finely detailed applications. The radius of curvature of the code strip 32 matches that of the movement of the slider 52. This particular code strip has a resolution of 127 lines per inch. The code strip 62 is a thin, clear film which may be printed, for example, using a high resolution (i.e., 2400 dots per inch (dpi)) laser printer. It should be understood that, with appropriate modification to the encoder 58, the code strip 62 may be a reflective strip.

Figure 8:
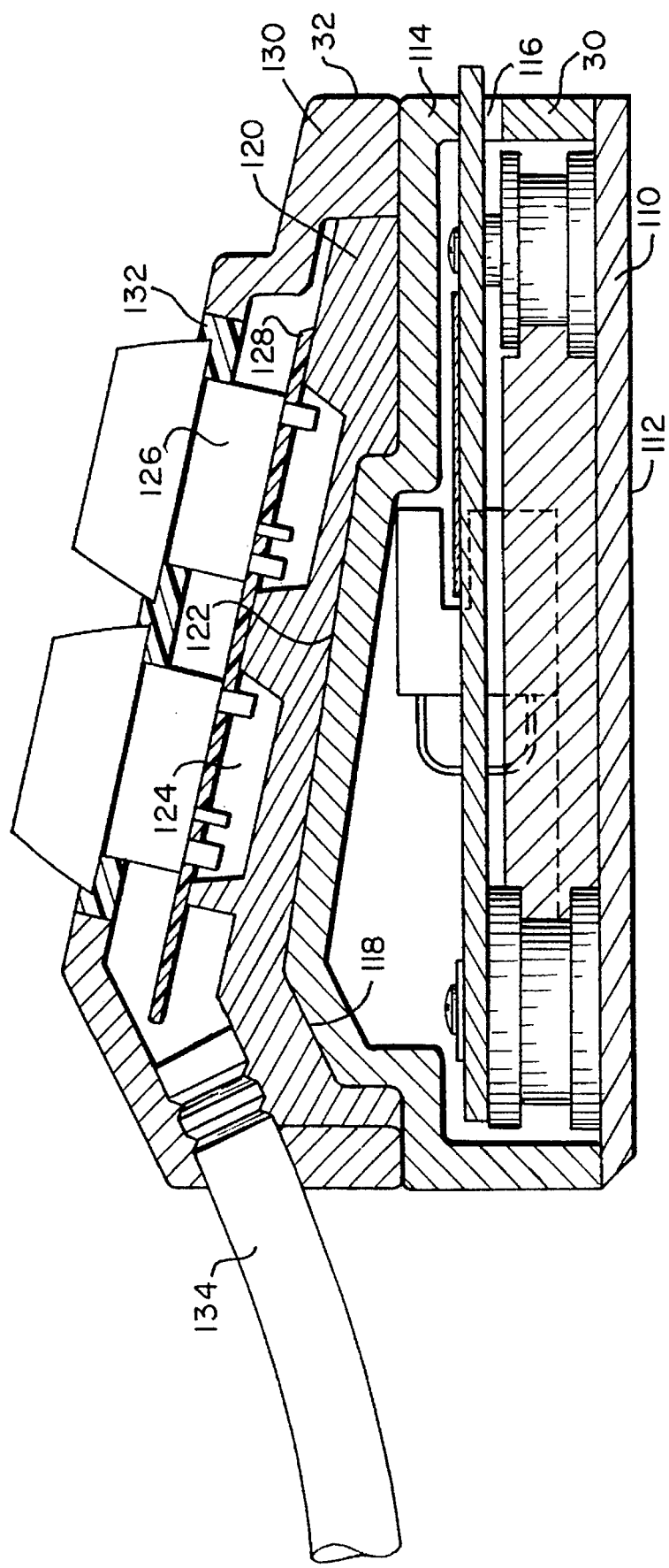
FIG. 8 is a cross section of the embodiment shown in FIG. 1.

The construction of the housing sections 30 and 32 will now be described in more detail in connection with FIG. 8. FIG. 8 is a cross section of the combined first and second sections 30 and 32 as taken along lines 8 of FIG. 1. The first section 30 has a base 110, which is preferably has a layer of non-slip material on its bottom surface 112, such as rubber. The top section 114 includes a gap 116 for a slider handle (not shown). It also has a shape along the top edge 118 for engaging with the second section 32. The shape of the top surface 118 can vary substantially, and is not limited to the one shown. The engaging surfaces may be made to lock with each other, for example, by having a dovetail shape.

The second section 32 has a bottom portion 120 which engages with the surface 118 of the first section 30 along its bottom surface 122. The bottom portion 120 also includes voids 124 to allow a space for electrical connections of the keys 126 to a printed circuit board 128. The top section 130 of the second section 32 includes areas 132 for allowing space for the keys 126. The second section 32 receives a cord 134 for connecting the interface to the computer. Similarly, the bottom, first section 30 also includes such a cord (not shown). The top and bottom housing sections 30 and 32 are preferably made of a heavy material to reduce movement of the slider when in use. For example, these sections may be made of investment or plaster cast aluminum.

Figure 9:
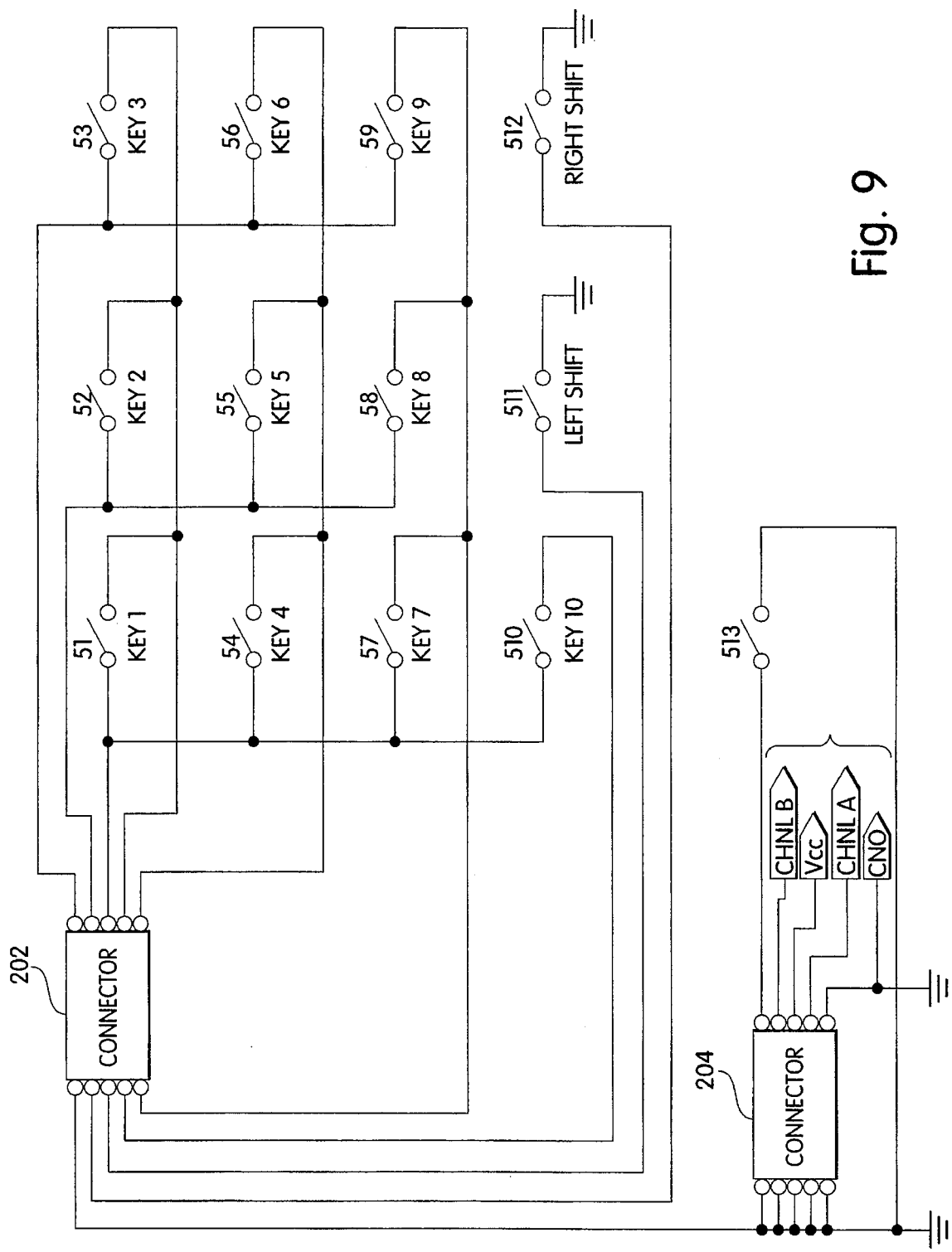
FIG. 9 is schematic circuit diagram of the mechanical user interface of the embodiment of FIG. 1.
Figure 10:
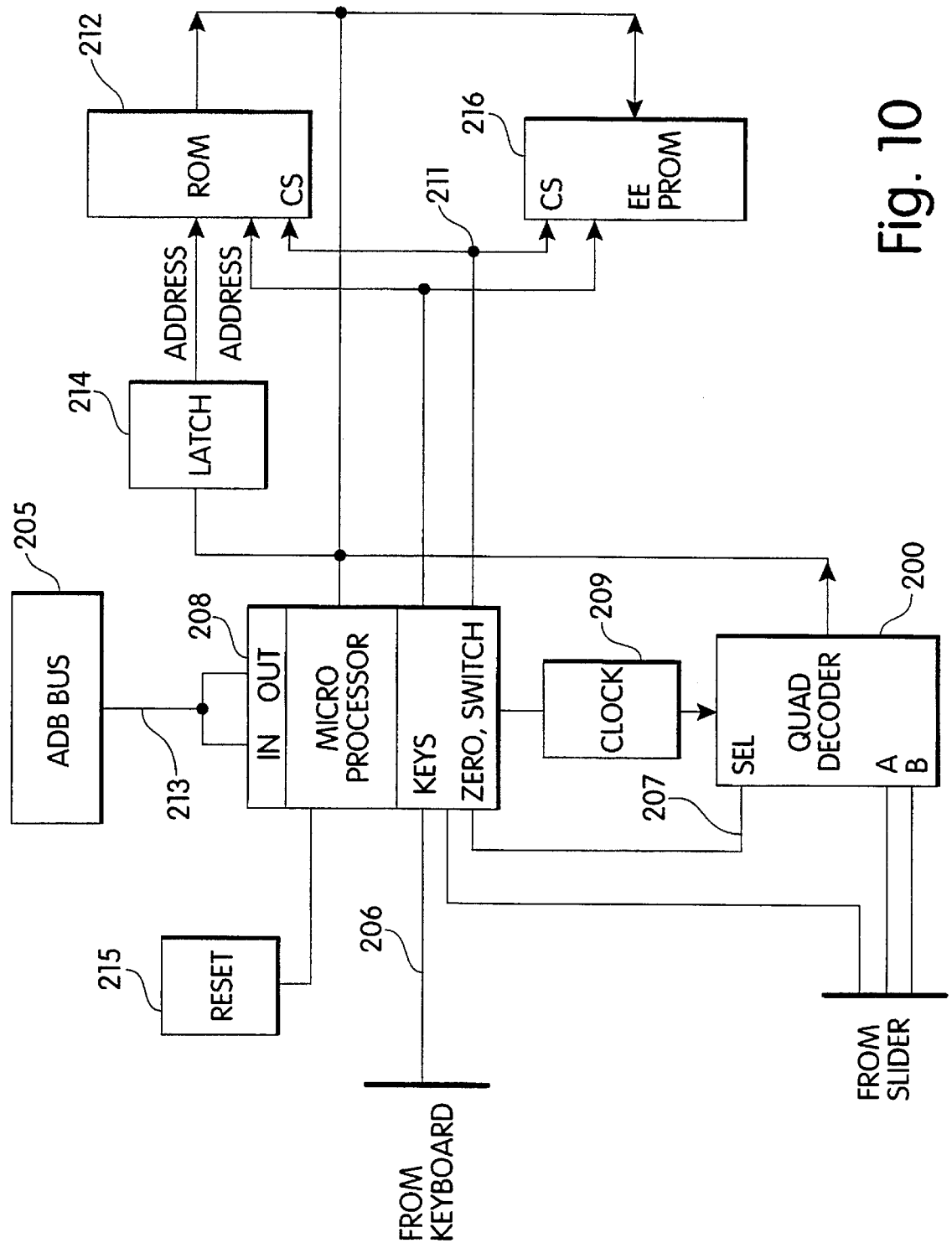
FIG. 10 is a schematic circuit diagram of an interface between the mechanical user interface and a computer.

A schematic circuit diagram of the electrical connections of this embodiment will now be provided in connection with FIGS. 9–10. All of the keys of the keyboard section 32 are switches. The slider assembly provides output channels A and B from the position encoder, the binary output signal from the zero-position detector, and may also include a switch S13. The keyboard switches S1–S12 form a matrix, by virtue of the connections to connector 202, whose rows and columns are polled, as is well known in the art, to determine which keys are depressed.

Given such a device as described above, the outputs for the keys and the slider mechanism 34 can be provided to a computer to be used by computer programs. Because most computers expect input signals to be in a predetermined format, circuitry is often required to convert signals from such mechanical user interfaces to signals corresponding to the expected format for the computer. Such circuitry is well known in the art for typical keyboard and mouse devices for most computer systems.

FIG. 10 illustrates schematically a circuit for converting inputs from the mechanical user interface of this embodiment the present invention to the ADB 205 (Apple Desktop Bus) standard as used in Macintosh Computers, made by Apple Computer Company, Cupertino, Calif. It should be understood that the invention is not limited to use in conjunction with an ADB bus. Many other busses may be used to connect this device to a computer, such as the RS-232 or IBM Game Port bus.

The connectors 202 and 204 of FIG. 9 are connected to a microprocessor 208 and a decoder 200. Each pin of each connector is accessed. The data is provided as inputs and outputs 206 to the keyboard microprocessor 208. The channel A and channel B values from the optical encoder are provided to the quadrature decoder 200 which provides a ones complement 16 bit output, read as two separate bytes, indicative of the direction and the amount of movement of the slider. This data is provided to the microprocessor 208 which accessed each byte via the SELECT input 207.

The microprocessor 208 may be an eight-bit 80C31 processor controlled by a program (firmware) stored in read only memory (ROM) 212 via latch 214. The circuit of FIG. 10 also includes a flash memory 216, such as an EEPROM, into which an alternate program (or firmware) may be placed. Either the program in the ROM or the program in the flash memory may be used, as determined by the user, by setting the CHIP SELECT input 211 via the microprocessor 208. The ROM may be eliminated to create a purely user-programmable device. Such a circuit provides user programmability of the outputs of the mechanical input device. A clock 209 synchronizes the operation of microprocessor 208 and quadrature decoder 200.

The program in microprocessor 208 for controlling this circuit will now be described in more detail. This program has three main components: an interrupt driver, a high level scheduling loop, and routines for manipulating information from the sensor devices.

The interrupt driver is responsible for sending data over the ADB bus. The host computer polls each ADB device by sending an interrupt via line 213 for any data, and the interrupt driver responds to the host request immediately. To maintain accurate bus timing, a timer is used to generate a serial data stream to the ADB via the same line 213. When the host requests data to be transmitted, the interrupt driver enters a software loop which shifts data (MSB first) onto the ADB bus. The hardware timer is checked during the loop to conform with the specified ADB timing. The host can ask that data be read from or written into typically four 16-bit registers, which may be extended to 24-bits. These registers serve as the interface between the routines for manipulating information from the sensor devices, and the interrupt driver from the keyboard matrix, the slider switch, the zero position sensor, the left shift key, the right shift key and the optical encoder.

The routines for manipulating the sensor device data gather data periodically, such as once every ten milliseconds, and place the information into registers. On demand from the host, the interrupt driver moves the data to or from these registers from or onto the ADB bus.

The keyboard is automatically debounced by operation of the main scheduling loop which periodically collects data (e.g., every ten milliseconds). Data is generated for the key matrix input which indicates which key was depressed and whether a logical one is up or down. This data is placed in the R0 interface register which is sent to the host upon request by the interrupt driver. The encoder is periodically read as well and its data is placed into the upper 12 bits of the R1 interface register, which again is sent by the interrupt driver upon host request. The lower four bits of R1 contains an unused bit set to zero, a signature bit set to one, and the zero-position detector and slider switch values.

The mechanical user interface also has two input data values: a code which causes the count of the quadrature decoder to be set to zero and an enhanced information mode. The first command is sent by the host to register R1 (e.g., by setting the MSB of this register to "1") when it has determined where the zero position of the mechanical user interface is. This command sets the count value of quadrature decoder 200 to zero. The second command extends the R1 register to 24 bits and allows an indicator of the currently available version of the firmware to be returned in the third byte. Using this command the computer can determine if the user has changed the firmware for the mechanical user interface.

The main scheduling loop is responsible for monitoring the timer and calling routines to gather data from the keyboard from the sensors and place them into interface registers every ten milliseconds. It is also responsible for handling standard system reset and power up reset functions in response to reset circuitry 215.

The mechanical user interface, as described above, may be attached directly to a computer, such as the Apple Macintosh, for use with application programs such as computerized film editing systems. The Apple Macintosh recognizes this embodiment of the invention as a standard input device, using its own input device initialization software. Other programs thus may manipulate information received from this device. Some additional software, however, is used to initialize this embodiment so that it provides absolute, rather than relative, position information. Such a program either may instruct the user to place the device at the zero position, or may wait until the zero position is reached. This is readily determined by detecting the output from the photomicrosensor placed at the zero position. Once the zero position is determined, the count of the quadrature decoder 200 may be set to zero. Thus, movement of the slider in a direction may be measured, and the actual position of the slider may be determined on the basis of the number of counts moved from the zero-position.

Flow charts for the programs for the mechanical user interface will now be described in connection with FIGS. 11–14. In order to initialize the mechanical user interface (MUI) the logical address on the computer for the MUI is determined by counting the number of devices attached to the computer (step 220), and for each device, sending a command through the ADB bus to determine if it is the mechanical user interface (step 222). The circuit described above in connection with FIG. 9 responds to such a command and returns what is known as the signature (the lower 4 bits of the R1 register). If the signature returned by a device is the same as the predetermined signature for the MUI, the location of the MUI device can be determined.

Once the location of the MUI device is determined, a number of values can be set. For example, a frames per second rate can be set to a predetermined function and the current count of the device can be set to a predetermined value. It can also be indicated that the device is not calibrated, and the location of the MUI device (i.e., its logical address) may be stored.

When the MUI is initialized, a Vb1 task may be established (step 226). A Vb1 task is a program which is executed whenever a vertical blanking interrupt is generated in the computer. The Vb1 task can respond to each interrupt or after a fixed number of interrupts, such as every two. Techniques for setting up Vb1 tasks are well known in the art.

Figure 11:
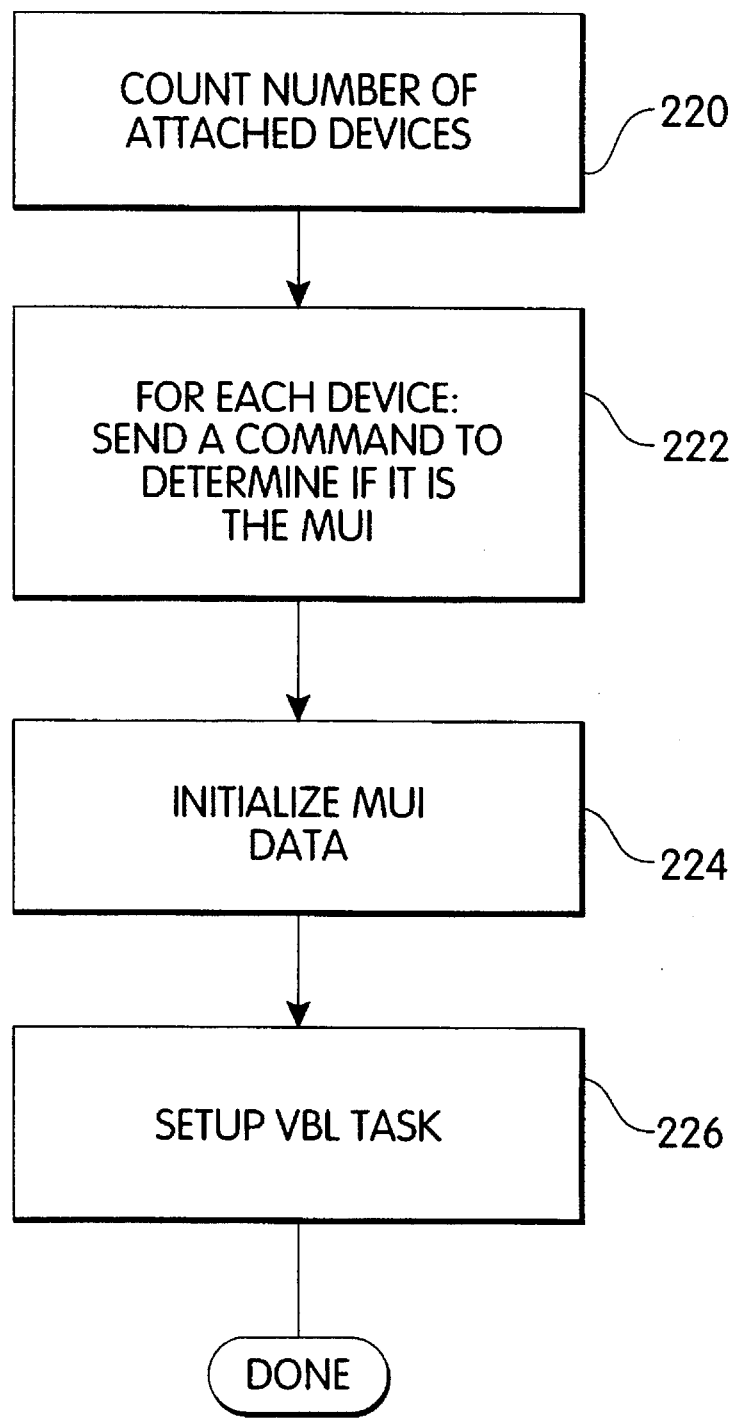
FIG. 11 is a flow chart describing how use of the mechanical user interface is initialized on the computer.
Figure 12:
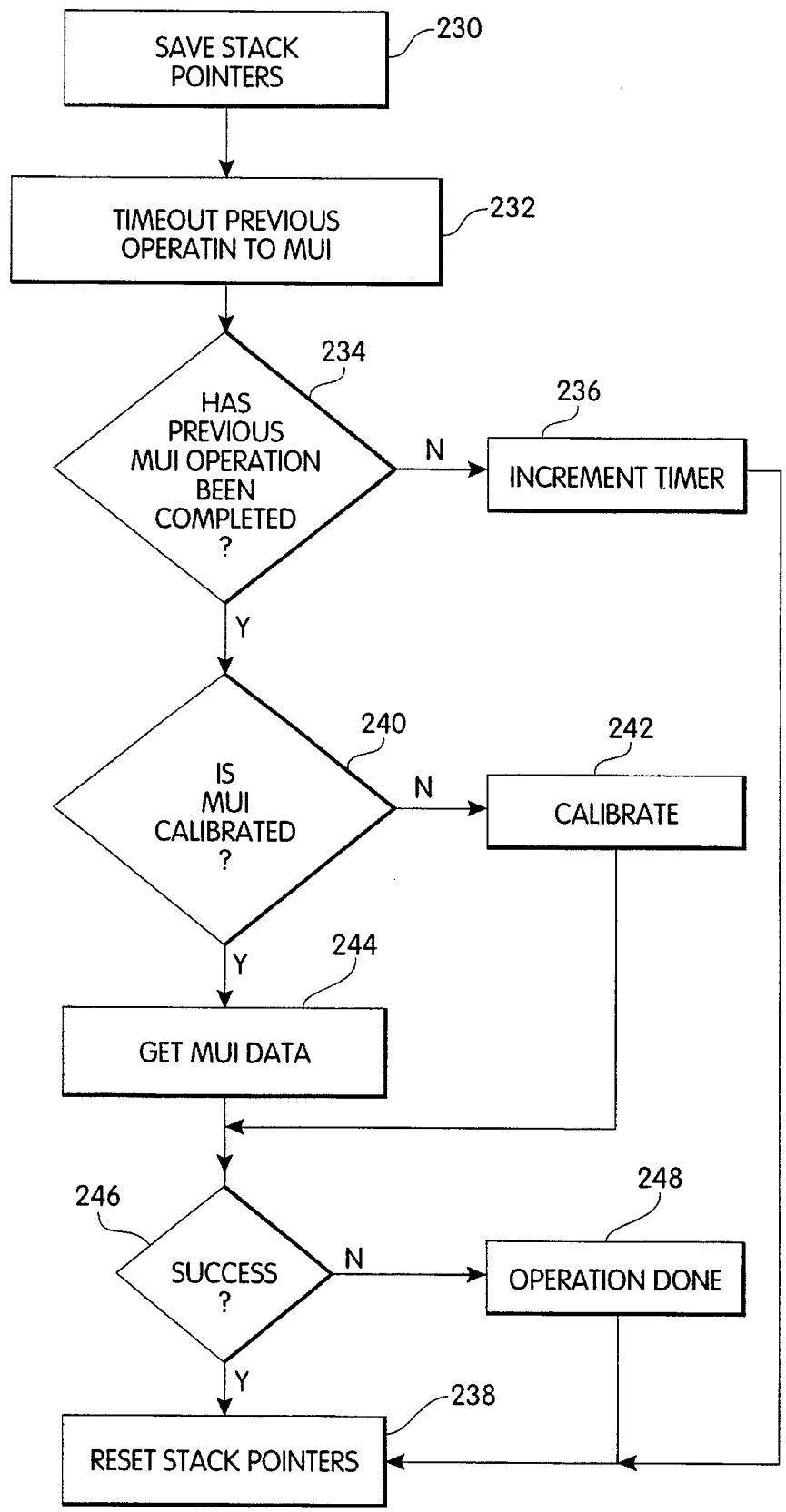
FIG. 12 is a flow chart describing how the mechanical user interface is periodically polled.

The Vb1 routine which is established in step 226 of FIG. 11, will now be described in connection with FIG. 12. The first step 230 of this Vb1 routine is saving any stack pointers in the operating system, as is standard for most Vb1 tasks. The next step 232 is timing out any previous operation performed with a mechanical user interface. That is, if a timer has exceeded a certain threshold, the operation is considered aborted and the timer is reset. Next, in step 234, it is determined whether the previous operation to the MUI has been completed. If it has not been completed, the timer used for time out purposes is incremented and this Vb1 task is completed and the stack pointers are reset in step 238. If the previous operation has been completed, it is determined in step 240 whether the MUI has been calibrated. If the MUI has not been calibrated, it is then calibrated in step 242. Otherwise, the status of the MUI is obtained in step 244. If the operations for retrieving a MUI data or calibrating it were successful as determined in step 246, the Vb1 task is complete and the stack pointers are reset in step 238. If the operations were not successful, they are considered as done in step 248 and a record may be made of an error.

Figure 13:
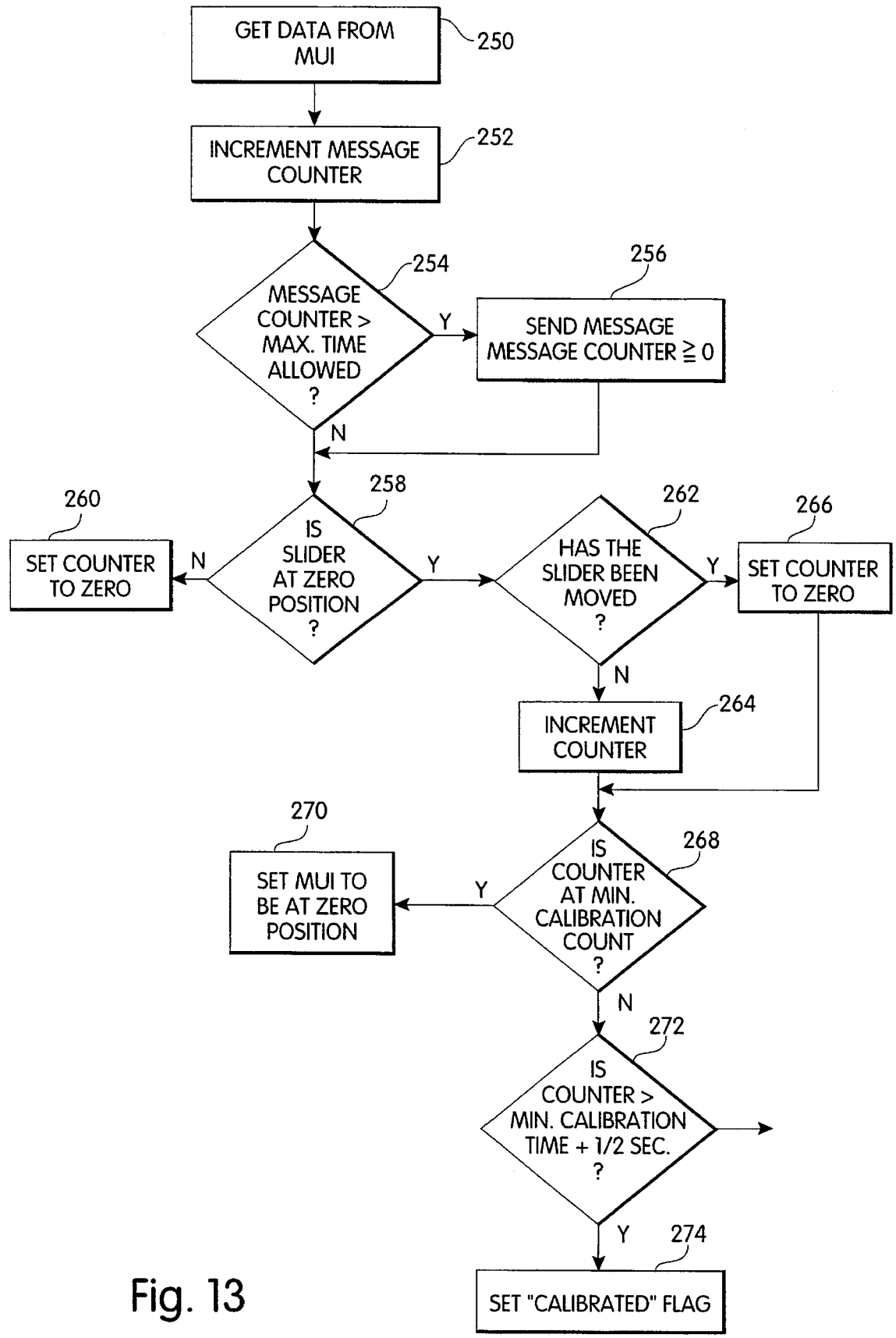
FIG. 13 is a flow chart describing how the mechanical user interface is calibrated.

FIG. 13 describes how the MUI is calibrated. The first step of calibration is obtaining the count and other data from the mechanical user interface in step 250. A message counter is then incremented in step 252. If the value of the message counter is greater than some maximum time allowed, as determined in step 254, a message is displayed to the user in step 256 requesting that the MUI be placed at its zero position. The message counter is then reset.

If the message counter has not reached its threshold yet, it is then determined in step 258 whether the slider is at the zero position by examining the value of the zero position detector status flag from the obtained MUI data. If the slider is not at the zero position, a calibration counter is then set to zero in step 260. This procedure is then complete and is not called again until the next Vb1 task. If the slider is at its zero position, its then determined whether the slider has been moved any large amount from the last time data was obtained from the MUI (step 262). In this embodiment, movement of four counts in either direction is acceptable. If it has not been moved, a calibration counter is incremented in step 264 (the same counter reset to zero in step 260). If the slider had been moved, the calibration counter is set to zero in step 266. The purpose of the calibration counter is to require that the slider be at its zero position for a predetermined amount of time before the computer considers the device to be calibrated.

The timing of calibration is performed through step 268, which determines whether the calibration counter has reached some predetermined minimum calibration count. When the minimum calibration time has been achieved, the count position of the MUI is set to zero in step 270. This is performed by sending a command to the mechanical user interface, in response to which the mechanical user interface sets its count register to zero. It may be desirable to determine whether this operation was successful, and, if it is not successful, to decrement the calibration counter in order to allow this command to be executed again.

In this embodiment, after the MUI has been set to its zero position after the minimum calibration time has elapsed, the MUI is not considered calibrated until further time has elapsed, for example, half a second. This is determined in step 272 where the calibration counter is compared to the minimum calibration time incremented by half a second, or other predetermined value. Once the slider has been in its zero position for this amount of time, the MUI is indicated as calibrated to the computer by setting a "calibrated flag" in the memory of the computer.

Figure 14:
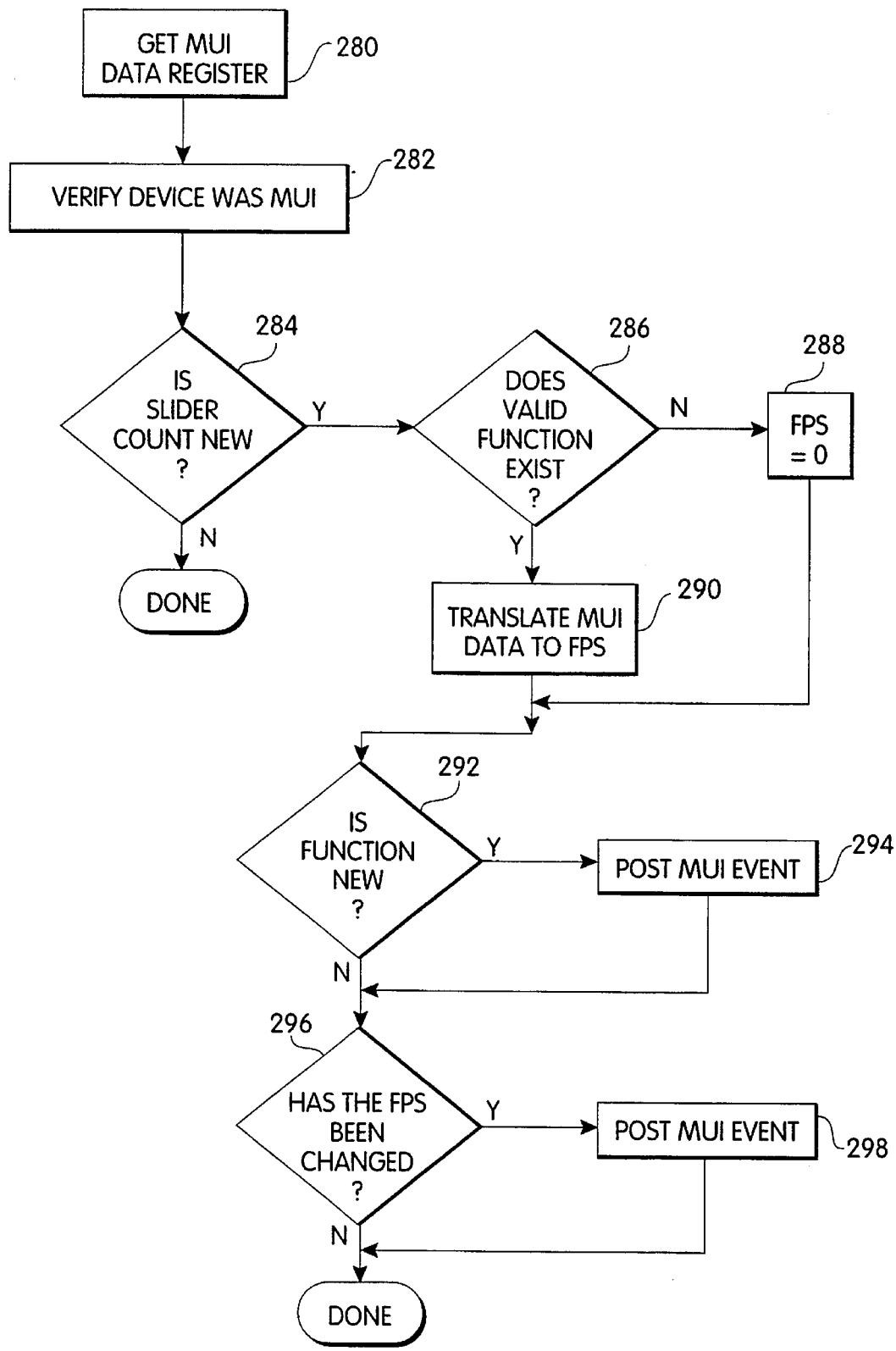
FIG. 14 is a flow chart describing how data is retrieved from the mechanical user interface and converted to frame speed rates.

The process of obtaining data from the MUI will now be described in connection with FIG. 14. The first step 280 is retrieving data from the data register of the mechanical user interface. The next step 282 is verifying that the device was in fact the mechanical user interface. This step is performed by looking at the signature, as described above. Next, in step 284, it is determined whether the count provided from the slider is new. If the count is not new, the slider is not changed and no further steps need to be performed. If the slider count is new, it is next determined whether a valid function exists, known as a callback function. A suitable callback function is used to translate the raw data from the MUI into frame advancement information, such as a frame per second (FPS) rate or single frame advancement. If no valid callback function exists, the frame per second rate is set to zero in step 288. Otherwise, the MUI data is translated to a frame per second rate in step 290. If the callback function is a new function as determined in step 292, an event is posted to the application program requesting the information (step 294). It is determined whether the function is new by comparing the location in the computer memory which stores the function. Next, in step 296, it is determined whether the frames per second rate has been changed. If the rate has changed an event is posted in step 298. If the rate has not changed or if after the MUI event has been posted, the process is complete.

With the aforementioned procedures, the mechanical user interface is periodically polled to determine its status. Application programs can then access data obtained by these routines. For examples, the frames per second rate can be obtained by an application program for use in a film or video editing application. An application program can also set the pointer for the callback function to a new callback function which can be used to provide different frames per second rates.

This device is particularly useful in connection with computerized film and video editing systems. Referring back to FIG. 3, the provisions of ramp shaped cams 82 for engaging a roller 68 at the zero position enables an editor to simply tap the slider 52 to indicate that only single frame advancement is desired. Due to the ramp shape 82, and the spring loading of the rollers 68, the slider 52 returns back to the zero position. The detection of such movement can be performed by a computer program by detecting whether the slider has been moved a number of counts less than a given, programmable threshold. If the number of counts remains less than this threshold for less than a predetermined amount of time, (as determined by a user), the film is advanced only a single frame. Because the device acts in a more intuitive manner, an editor needs less skill to learn how to make this device advance film frame-by-frame than with the Steenbeck controller. For any number greater than that threshold, a corresponding frame per second rate can be determined, according to any linear or non-linear function. The detents 84 may be provided at positions to indicate sound speed (the normal speed for video). Sound speed can be any number of standards, such as 30 frames per second, 24 frames per second, or NTSC (29.97) frames per second. Movement in a direction away from zero beyond the sound speed detents can be used to indicate fast forward viewing of a video.

As a variety of applications may also use this device, it should be understood that the mechanical user interface described is not limited to use with video editing systems, except as may be indicated by the appended claims.

Other modifications could be made to the device described above. For example, the slider mechanism 34 may be made to move linearly, rather than along a radius of curvature. Rotation may be provided by having a fixed point of rotation to which a handle may be attached rather than by attaching a slider to a track via rollers. Further, the attachment of the encoder module to a fixed base, in conjunction with a code strip attached to a moving slider is only one of many possible methods for determining relative lateral movement between a slider and a base.

The slider mechanism may also be enhanced in functionality by providing a switch as mentioned above. For example, a switch may be placed in the handle 34, however, electrical wiring would move with the slider. Therefore, it is preferable to provide a long switch actuation pad, attached to the supporting plate along the length of the movement of the slider. The switch may be activated by depressing or lifting the slider handle.

Having now provided a detailed description of the present invention, it should be apparent to those skilled in this art that the foregoing is illustrative only and not limiting, having been presented by way of example only. Numerous other embodiments and modifications thereof are contemplated as falling within the scope of the present invention and as defined by the appended claims and equivalents thereto.

What is claimed is:

1. A mechanical user interface for a computer, comprising:

a base having a location defining a zero-position;

a slider adapted to move on the base only along a single arc having a fixed radius of curvature; and a position encoder responsive to relative movement between the slider and the base for providing an electrical output indicative of a distance of the slider from the zero-position on the base.

2. The mechanical user interface of claim 1 wherein the arc corresponds to a natural movement of a thumb of a hand while the hand is in a substantially fixed position.

3. A mechanical user interface comprising:

a keyboard section; and a slider section for housing a slider for providing an output indicative of a distance of the slider from a predetermined zero position on a base, said slider section having means for engaging said keyboard section in a plurality of positions.

4. The mechanical user interface of claim 3, wherein the means for engaging the keyboard section includes means for slidably and detachably engaging the keyboard section.

5. A mechanical user interface for a computer comprising:

a keyboard section; and a slider section including a slider for providing an output indicative of a distance of the slider from a predetermined zero-position on a base, said slider section having means for engaging said keyboard section in a plurality of positions, wherein the slider section and the keyboard section both have an arcuate shape which corresponds to an arc followed during movement of a thumb of a hand while the hand is in a substantially fixed position.

6. A mechanical user interface for a computer for editing a motion picture defined by a plurality of frames, comprising:

a slider mechanism providing an output indicative of a distance of a slider from a predetermined zero-position on a base; and means, responsive to the output of the slider mechanism, for advancing the motion picture by a single frame when the indicated distance is less than a threshold and for advancing the film by a programable rate when the indicated distance is greater than the threshold.

7. The mechanical user interface of claim 5, wherein the threshold is programmable.

8. A mechanical user interface for a computer, comprising:

a slider mechanism providing an output indicative of a distance of a slider, wherein the slider is constructed and arranged to move along an arc within a plane, from a predetermined zero-position on a base; and a switch adapted to be activated by movement of the slider, orthogonal to the plane, when the slider is in any position.

9. A mechanical user interface for a computer, comprising:

a base having a location defining a zero-position;

a slider adapted to slide on the base;

a position encoder responsive to relative movement between the slider and the base for providing an electrical output indicative of a distance of the slider from the zero-position on the base; and wherein the base is a supporting plate having a track and the slider includes rollers which engage the track.

10. A mechanical user interface for a computer, comprising:

a base having a location defining a zero-position;

a slider adapted to slide on the base;

a position encoder responsive to relative movement between the slider and the base for providing an electrical output indicative of a distance of the slider from the zero-position on the base; and wherein the position encoder is a linear optical incremental encoder, and wherein the slider has a code strip attached thereto for engagement with the linear optical incremental encoder.

11. A mechanical user interface for a computer, comprising:

a base having a location defining a zero-position;

a slider adapted to slide on the base;

a position encoder responsive to relative movement between the slider and the base for providing an electrical output indicative of a distance of the slider from the zero-position on the base; and wherein the base has a spring loaded roller mechanism which engages an edge of the slider.

12. The mechanical user interface of claim 11 wherein the spring loaded roller mechanism includes an arm, a roller attached to the arm, and a spring attached to the arm and to the base.

13. The mechanical user interface of claim 12, wherein the slider has an indentation and a ramp shaped cam at the edge engaged by the roller mechanism.

14. A mechanical user interface for a computer, comprising:

a base having a location defining a zero-position;

a slider adapted to slide on the base;

a position encoder responsive to relative movement between the slider and the base for providing an electrical output indicative of a distance of the slider from the zero-position on the base; and wherein when the slider is at the zero position, a roller, attached to the base, engages a corresponding zero detent formed in the slider.

15. A mechanical user interface for a computer, comprising:

a base having a location defining a zero-position;

a slider adapted to slide on the base;

a position encoder responsive to relative movement between the slider and the base for providing an electrical output indicative of a distance of the slider from the zero-position on the base; and wherein the position encoder includes a photomicrosensor attached to the base, and a pin attached to the slider and which engages the photomicrosensor when the slider is at the zero position.

16. A circuit for directing inputs from a mechanical user interface, which provides an output indicative of a distance of a slider from a zero-position on a base supporting the slider, to an input bus of a computer, the circuit comprising:

a microprocessor;

means, responsive to an output of the mechanical user interface, for providing an output indicative of the distance of the slider from the zero-position on the base;

a register connected to the input bus; and wherein the microprocessor includes a processor controlled by a program stored in a read-only memory; and wherein the program causes the processor to operate, in response to a request from the computer for data to be transmitted, as means for placing the output of the means for providing into the register and means for shifting the output indicative of the distance of the slider from the zero-position from the register onto the input bus.

17. The circuit of claim 16, wherein the circuit includes means for setting the output of the means for providing to zero.

18. A computerized editing system for editing a motion picture defined by a plurality of frames and comprising:

a slider mechanism providing an output indicative of a distance of a slider from a predetermined zero position; and a display system, responsive to the output of the slider mechanism, for displaying one frame adjacent to any currently displayed frame in the motion picture when the indicated distance is less than a programmed threshold, and for displaying the motion picture at a programmable rate when the indicated distance is greater than the programmed threshold.

19. A mechanical user interface for a computerized editing system, for editing a motion picture defined by a plurality of frames, the mechanical user interface comprising:

slider mechanism having a base that includes a surface, and a slider adapted to slide along the surface, the slider mechanism providing an output indicative of a distance of the slider from a predetermined zero position on the base, and a display system responsive to the output of the slider mechanism to display the motion picture at a rate which is dependent upon the output of the slider mechanism.

20. A method for displaying a motion picture on a display device, wherein the motion picture is defined by a sequence of frames, the method comprising the steps of:

sliding a slider along a surface of a base, receiving a signal indicative of a distance of the slider from a predetermined zero position on the base, converting the distance indicated by the signal into a rate, and displaying the motion picture on the display device at the rate.

21. The method of claim 20, wherein the step of converting includes the step of comparing the distance to a predetermined threshold and setting the rate to be proportional to the distance when the distance is greater than the predetermined threshold.

22. A method for displaying a motion picture on a display device, wherein the motion picture is defined by a sequence of frames, the method comprising the steps of:

receiving a signal indicative of a distance of a slider from a predetermined zero position on a base;

converting the distance indicated by the signal into a rate; and displaying the motion picture on the display device at the rate, wherein the step of converting comprises the step of comparing the distance to a predetermined threshold and setting the rate so as to advance the motion picture by only one frame when the distance is less than the predetermined threshold.

23. A mechanical user interface, comprising:

a base having a location defining a zero-position;

a movable member co-acting with the base to move only along a predetermined non-linear curve; and a position encoder responsive to relative movement between the movable member and the base for providing an electrical output indicative of a distance of the movable member from the zero-position on the base.

24. The mechanical user interface of claim 23, wherein the predetermined non-linear curve is an arc having a fixed radius of curvature.

25. The mechanical user interface of claim 23, wherein one of the base and the movable member includes a surface having the predetermined non-linear curve, and the other of the base and the movable member is adapted to move along the surface having the predetermined non-linear curve.

26. The mechanical user interface of claim 23, wherein the electrical output of the position encoder is compatible with an interface of a computer, and the mechanical user interface further comprises:

a control section adapted to provide signals for the computer, and adapted to engage the base slidably in a plurality of positions.

* * * * *